US008033488B2

(12) United States Patent
Grah

(10) Patent No.: US 8,033,488 B2
(45) Date of Patent: *Oct. 11, 2011

(54) ERGONOMIC PORTABLE PILL CRUSHER TOOL AND SYSTEM

(76) Inventor: Dolores H Grah, Greenfield, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,513

(22) Filed: Jan. 14, 2011

(65) Prior Publication Data

US 2011/0101140 A1 May 5, 2011

Related U.S. Application Data

(63) Continuation of application No. 12/144,138, filed on Jun. 23, 2008, now Pat. No. 7,896,273.

(60) Provisional application No. 60/958,694, filed on Jul. 9, 2007.

(51) Int. Cl.
*A01D 34/90* (2006.01)
*A47J 42/00* (2006.01)

(52) U.S. Cl. .................................. 241/169.1; 241/169.2

(58) Field of Classification Search ............... 241/169.1, 241/169.2, DIG. 27; 135/66; 16/114.1
See application file for complete search history.

(56) References Cited

U.S. PATENT DOCUMENTS 2,437,099 A 3/1948 Krupp
2,593,828 A 4/1952 Arey
2,602,596 A 7/1952 Jones
2,741,255 A 4/1956 Neptune
3,416,395 A 12/1968 Hanson
3,800,361 A 4/1974 Stauffer
4,056,020 A 11/1977 Coviello
4,209,136 A 6/1980 Linden et al.
4,212,430 A 7/1980 Dale et al.
4,341,356 A 7/1982 Hiott et al.
4,366,930 A 1/1983 Trombetti, Jr.
4,890,355 A 1/1990 Schulten
4,899,415 A 2/1990 Wheeler
D310,564 S 9/1990 Besaw
4,967,971 A 11/1990 Smith
5,067,666 A 11/1991 Sussman
5,123,601 A 6/1992 Lavin et al.
5,178,337 A 1/1993 Lupoli (Continued)

OTHER PUBLICATIONS

U.S. Food and Drug Adiministration, "FDA Issues Bar Code Regulation", Web page:http://www.fda.gov/oc/initiatives/barcode-sadr/fs-barcode.html, Feb. 25, 2004, pp. 1 and 2.

(Continued)

*Primary Examiner* — Bena Miller

(74) *Attorney, Agent, or Firm* — Aust IP Law; Ronald K. Aust

(57) ABSTRACT

An ergonomic portable pill crusher tool includes an elongate handle having a first axis, and a shaft having an offset portion and a work portion. The offset portion is connected to the handle. The offset portion has a second axis arranged to be oblique with respect to the first axis of the handle at a first angle facing a central portion of the handle. The work portion has a third axis arranged to be oblique with respect to the second axis of the offset portion at a second angle facing away from the central portion, such that an extent of the work portion along the third axis is substantially perpendicular to the first axis of the handle at the central portion of the handle. A distal end of the work portion has a tip to facilitate application of a working force to crush the pill(s).

20 Claims, 3 Drawing Sheets

U.S. PATENT DOCUMENTS

| | | | | |
|---|---|---|---|---|
| 5,440,784 | A | | 8/1995 | Hull et al. |
| 5,531,386 | A | | 7/1996 | Jensen |
| 5,823,451 | A | | 10/1998 | Sharpe |
| 5,863,001 | A | | 1/1999 | Schulze |
| 5,915,637 | A | | 6/1999 | Parsons |
| 5,924,636 | A | | 7/1999 | Calderon |
| 6,000,414 | A | * | 12/1999 | Crusor ............................ 135/66 |
| D421,557 | S | | 3/2000 | Wang et al. |
| 6,059,209 | A | | 5/2000 | Barson |
| 6,357,679 | B1 | | 3/2002 | Radke |
| 6,378,402 | B1 | | 4/2002 | Kalomeris et al. |
| 6,508,424 | B1 | | 1/2003 | Marshall |
| 6,519,799 | B1 | | 2/2003 | Bartholomew |
| 6,622,949 | B1 | | 9/2003 | Baswick et al. |
| 6,637,683 | B1 | | 10/2003 | Wilbur |
| 6,637,685 | B1 | | 10/2003 | Kruger |
| 6,922,870 | B2 | | 8/2005 | Tontz, Sr. |
| 6,966,509 | B2 | | 11/2005 | Janzen |
| 7,032,851 | B2 | | 4/2006 | Demske et al. |
| 7,252,254 | B1 | | 8/2007 | Engel et al. |
| 2009/0229642 | A1 | * | 9/2009 | Hutt ................................ 135/66 |

OTHER PUBLICATIONS

RX & Health, Cane Offset Adjustable Designer & Endurance Quad Cane, web page, Jul. 2008, http://rxandhealth.com/zc/index.php?main_page=index&cpath=2_10.

FLAMEWRENCH.COM product list, Item 25620: OEM Fix-A-Thread Repair Kit UNF Fine 7/16 "-20, web page, pp. 11 & 12, http://storesense2.megawebservers.com/stores/h/HS5607/cataloglist.html.

* cited by examiner

ERGONOMIC PORTABLE PILL CRUSHER TOOL AND SYSTEM

CROSS REFERENCE TO RELATED APPLICATIONS

This is a continuation of U.S. patent application Ser. No. 12/144,138 filed Jun. 23, 2008 now U.S. Pat. No. 7,896,273, which is a non-provisional application based upon U.S. Provisional Patent Application Ser. No. 60/958,694, entitled—"Pill pro" pill crusher—, filed Jul. 9, 2007, which are incorporated herein by reference.

MICROFICHE APPENDIX

None.

GOVERNMENT RIGHTS IN PATENT

None.

BACKGROUND OF THE INVENTION

1. Field of the Invention

The present invention relates to pill crushers, and, more particularly, to an ergonomic portable pill crusher.

2. Description of the Related Art

Part of the Healthy People 2010 campaign is improved medication safety. Currently many hospitals barcode scan the patient and the medication to correlate the medication with the patient. At that point of care, it is desirable that the medication not be taken out of the patient's room, so as to reduce the chance of error.

One type of medication is a pill, also sometimes referred to as a tablet, which has a solid form. Some people, such as those with swallowing difficulties or a strong gag reflex, find it difficult to swallow a pill. It is known in the art to use pill crushers for crushing the pills, so as to convert the pill medications into powder form, which may be more easily ingested.

A typical pill crusher includes multiple parts, movable or a combination of movable and stationary parts, which interact to crush the pill. One such pill crusher, as disclosed in U.S. Pat. No. 6,637,685, has an arm having a pressure exerting head extending over and along an elongate base having a spring loaded rotational anvil, with a pivotal connection between the base and one end of the arm. In use, a rotational movement of the anvil member causes a pill to be both crushed and also simultaneously ground between the pressure and anvil members, which have serrated opposed faces.

It has been found, however, that in a hospital setting, some such pill crushers may be awkward to use. Also, some such pill crushers may require a sizeable area on which to operate, which can be a disadvantage in cramped quarters, such as in a hospital room. Also, some such pill crushers are not readily portable due to their overall size and/or weight. As used herein, the term "portable" means an object that has a size and weight that permits the object to be easily and completely inserted into a pocket of a typical medical garment, and without causing any discomfort to the person wearing the garment, such as due to weight, protruding edges, outside dimensions, etc.

Also, some pill crushers used by nurses in hospitals or nursing homes are kept in the medication room because they are too expensive for there to be one in each patient's room. Hence, nurses may crush the pills far away from the patient's bedside, leaving room for error.

What is needed in the art is an ergonomic portable pill crusher that is simple to use and is cost effective.

SUMMARY OF THE INVENTION

The present invention provides an ergonomic portable pill crusher tool and system that is simple to use and is cost effective.

The invention, in one form thereof, is directed to an ergonomic portable pill crusher tool for use in crushing a pill. The ergonomic portable pill crusher tool includes an elongate handle having a first end, a second end, a central portion, and a first axis. The first end is spaced apart from the second end along the first axis, with the central portion being located midway between the first end and the second end. A shaft has an offset portion and a work portion. The offset portion defines a proximal end of the shaft and the work portion defines a distal end of the shaft. The offset portion is connected at the proximal end to the second end of the elongate handle. The offset portion transitions to the work portion in a direction from the proximal end to the distal end. The offset portion has a second axis that is arranged to be oblique with respect to the first axis of the elongate handle at a first angle facing the central portion. The work portion has a third axis that is arranged to be oblique with respect to the second axis of the offset portion at a second angle facing away from the central portion, such that an extent of the work portion along the third axis is substantially perpendicular to the first axis of the elongate handle at the central portion of the elongate handle. The shaft has no connection to any auxiliary structure. The distal end of the work portion has a tip to facilitate application of a working force to crush the pill.

The invention, in another form thereof, is directed to an ergonomic portable pill crusher system for use in crushing a pill including an ergonomic portable pill crusher tool and a pill facilitating arrangement. The ergonomic portable pill crusher tool includes an elongate handle having a first end, a second end, a central portion, and a first axis, the first end being spaced apart from the second end along the first axis, with the central portion being located midway between the first end and the second end. A shaft has an offset portion with a second axis and a work portion with a third axis. The offset portion defines a proximal end of the shaft that is connected to the handle. The work portion defines a distal end of the shaft. The pill facilitating arrangement includes a holding surface configured to hold the pill and a covering member interposed between the distal end of the shaft and the holding surface.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, in one form, and such exemplifications are not to be construed as limiting the scope of the invention in any manner.

DETAILED DESCRIPTION OF THE INVENTION

Figure 1:
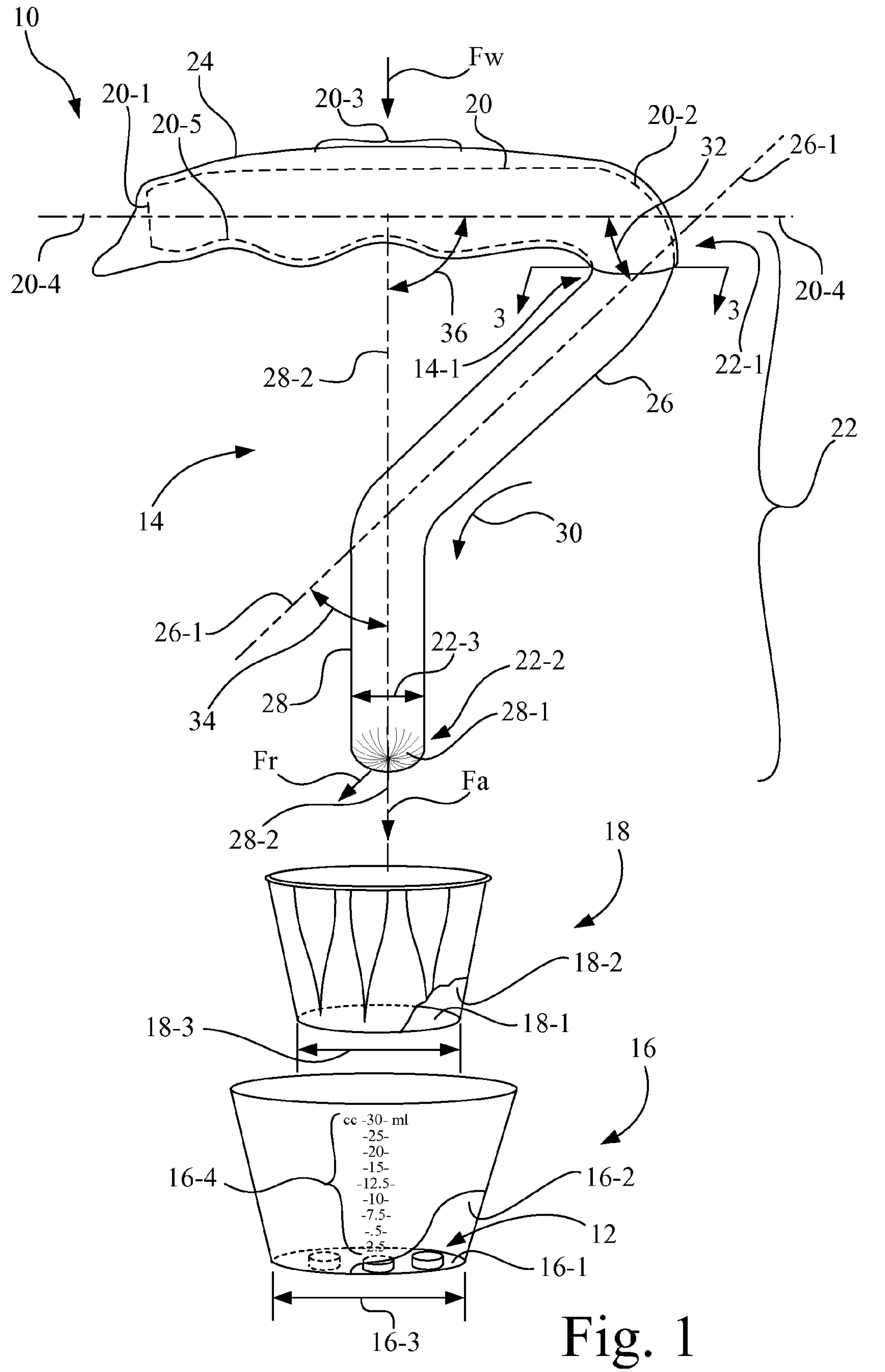
FIG. 1 is a perspective view of an ergonomic portable pill crusher system configured in accordance with an embodiment of the present invention, with a portion of the cups broken away to expose the respective bottom surface and side wall.

Referring now to the drawings, and more particularly to FIG. 1, there is shown an ergonomic portable pill crusher system 10 configured in accordance with an embodiment of the present invention for crushing one or pills, such as the plurality of pills 12. The ergonomic portable pill crusher system 10 includes an ergonomic portable pill crusher tool 14, a first cup 16 for holding the plurality of pills 12 during a pill crushing operation, and a second cup 18 for covering over the plurality of pills 12 held by first cup 16 during the pill crushing operation.

First cup 16, for example, may be formed from a transparent plastic, and includes a bottom surface 16-1 and a side wall 16-2 extending upwardly from bottom surface 16-1. Bottom surface 16-1 of first cup 16 has a diameter 16-3. Side wall 16-2 may include measurement indicia 16-4 for measuring a volume of crushed medication in powder form resulting from the crushing operation, i.e., the crushing of the plurality of pills 12.

Second cup 18, for example, may be a standard three-fourths ounce paper soufflé cup. Second cup 18 includes a bottom surface 18-1 and a side wall 18-2 extending upwardly from bottom surface 18-1. Bottom surface 18-1 of second cup 18 has a diameter 18-3 sized to be slightly smaller that diameter 16-3 of first cup 16.

Figure 2:
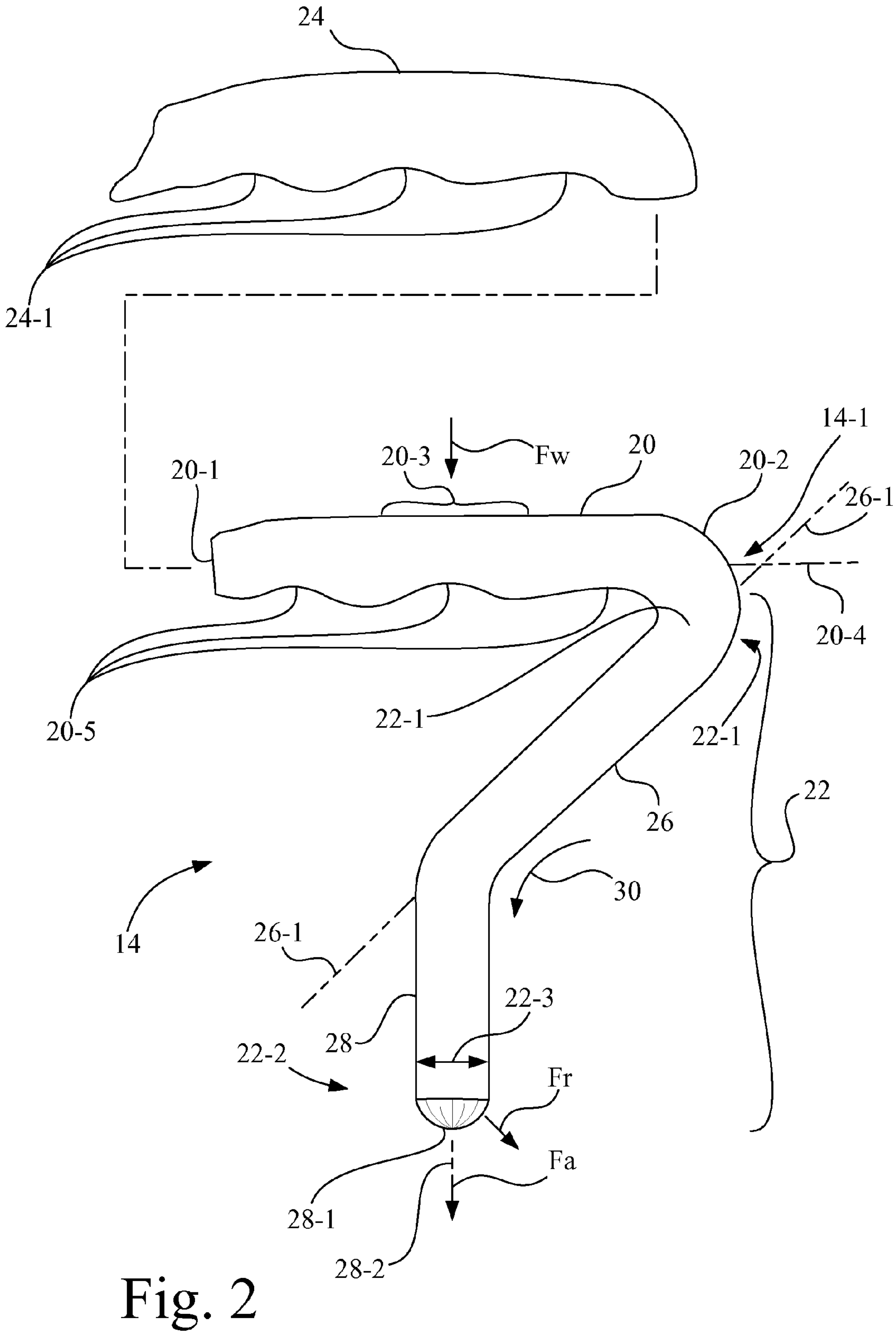
FIG. 2 is a side view of the ergonomic portable pill crusher tool of the ergonomic portable pill crusher system of FIG. 1, with the optional handle sleeve removed.
Figure 3:
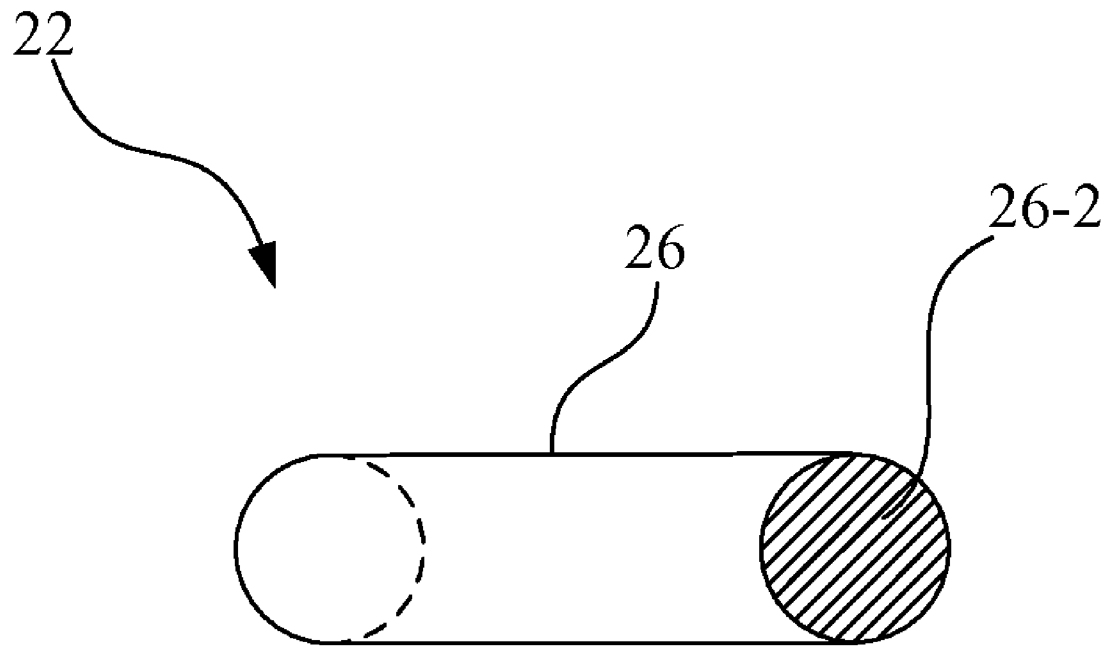
FIG. 3 is a sectional view of the ergonomic portable pill crusher tool of the ergonomic portable pill crusher system of FIG. 1 taken along line 3-3.

Referring also to FIGS. 2 and 3, ergonomic portable pill crusher tool 14 includes an elongate handle 20, a curved shaft 22, and optionally, a sleeve 24 fitted over elongate handle 20. Sleeve 24, for example, may be formed from an elastic material, such as rubber. Sleeve 24 may optionally include a plurality of handhold recesses 24-1 to accommodate grasping of elongate handle 20 by the fingers of a user.

Elongate handle 20 has a first end 20-1, a second end 20-2, a central portion 20-3, and a first axis 20-4. First end 20-1 is spaced apart from second end 20-2 along first axis 20-4, with central portion 20-3 being located midway between first end 20-1 and second end 20-2. As used herein, the term "central portion" means the central third of the entire lateral extent of elongate handle 20. Elongate handle 20 optionally may include a plurality of handhold recesses 20-5 to accommodate grasping of elongate handle 20 by the fingers of a user.

Shaft 22 has an offset portion 26 and a work portion 28. Offset portion 26 defines a proximal end 22-1 of shaft 22 and work portion 28 defines a distal end 22-2 of shaft 22. Distal end 22-2 of work portion 28 of shaft 22 has a diameter 22-3. Diameter 22-3 may be, for example, in a range of 10 to 20 millimeters, and in one embodiment is 15.9 millimeters (0.625 inches). Distal end 22-2 of work portion 28 of shaft 22 has a convex tip 28-1. Convex tip 28-1 may be in the form of a smooth outwardly extending curved surface.

Offset portion 26 is connected at proximal end 22-1 of shaft 22 to second end 20-2 of elongate handle 20. Offset portion 26 of shaft 22 may be integrally formed with elongate handle 20 such that shaft 22 and elongate handle 20 are formed as an integral one-piece device. Alternatively, it is contemplated that proximal end 22-1 of shaft 22 and second end 20-2 of elongate handle 20 may be threaded and screwed together to facilitate a threaded attachment thereof.

In the present embodiment, offset portion 26 transitions to work portion 28 in a direction 30 from proximal end 22-1 to distal end 22-2 of shaft 22. Offset portion 26 has a second axis 26-1 that is arranged to be oblique with respect to first axis 20-4 of elongate handle 20 at an angle 32 (less than 90 degrees, and preferably in a range of 30 to 60 degrees) facing central portion 20-3.

Work portion 28 has a third axis 28-2 that is arranged to be oblique with respect to second axis 26-1 of offset portion 26 at an angle 34 (less than 90 degrees, and preferably in a range of 30 to 60 degrees) facing away from central portion 20-3, such that an extent of work portion 28 along third axis 28-2 is substantially perpendicular at angle 36 to first axis 20-4 of elongate handle 20 at central portion 20-3 of elongate handle 20. As used herein, the term substantially perpendicular means an angle of 90 degrees, plus or minus 2 degrees. Convex tip 28-1 of distal end 22-2 of work portion 28 facilitates application of an axial force Fa and radial forces Fr, with respect to third axis 28-2, to the one or more pills, e.g., the plurality of pills 12 located in first cup 16. As shown in FIG. 1, second cup 18 is inserted into first cup 16, and interposed between convex tip 28-1 of distal end 22-2 of shaft 22 and the respective pill(s) located in first cup 16.

In some embodiments, ergonomic portable pill crusher tool 14 may include a flexure portion 14-1 located between elongate handle 20 and work portion 28 of shaft 22. Flexure portion 14-1 is configured to facilitate a radial flexure of work portion 28 along third axis 28-2 when a working force Fw is applied by a user along third axis 28-2 via elongate handle 20. Working force Fw may be primarily an axial force, but may include radial force components due to a rocking motion of ergonomic portable pill crusher tool 14 during use. Flexure portion 14-1 may be formed as a cantilever union of elongate handle 20 and shaft 22.

An amount of flexure resulting from flexure portion 14-1 may be defined based on the material forming offset portion 26 of shaft 22 and a cross-sectional area 26-2 of offset portion 26, and thus form flexure portion 14-1 in offset portion 26. The material forming shaft 22, including offset portion 26, may be for example a plastic or a metal (e.g., stainless steel). In one embodiment, for example, the amount of flexure at angle 32 may be selected to be in a range of two to five degrees upon application of 10 pounds of axial work force Fw to elongate handle 20. In another embodiment, for example, the amount of flexure at angle 32 may be selected to be in a range of zero to five degrees upon application of 10 pounds of axial work force Fw to elongate handle 20.

In embodiments wherein shaft 22 is made of plastic, the type of plastic may be selected to withstand the applied force Fw while providing the desired flexure (if any) based on the desired cross-sectional area 26-2. Alternatively, the cross-sectional area 26-2 may be selected to withstand the applied force Fw while providing the desired flexure (if any) based on the desired type of plastic. Also, the type of plastic is selected so as to not deteriorate when cleaned with normal medical disinfectant cleaning solutions, e.g., alcohol or bleach based solutions.

Likewise, in embodiments wherein shaft 22 is made of metal, the type of metal may be selected to withstand the applied force Fw while providing the desired flexure (if any) based on the desired cross-sectional area 26-2. Alternatively, the cross-sectional area 26-2 may be selected to withstand the applied force Fw while providing the desired flexure (if any) based on the desired type of metal. Also, the type of metal is selected so as to not deteriorate when cleaned with normal medical disinfectant cleaning solutions, e.g., alcohol or bleach based solutions.

During operation, a user positions one or more pills, e.g., the plurality of pills 12 shown in FIG. 1, into first cup 16, e.g., a standard 30 milliliter plastic cup. Second cup 18, e.g., a standard three-fourths ounce paper soufflécup, is placed in first cup 16 over the pill(s) so as to prevent pill fragments from flying out of first cup 16, and to prevent pill fragments from adhering to convex tip 28-1 of shaft 22 of ergonomic portable pill crusher tool 14.

The user inserts distal end 22-2 of ergonomic portable pill crusher tool 14 into second cup 18 with convex tip 28-1 contacting bottom surface 18-1 of second cup 18. The user then applies a firm working force Fw to elongate handle 20 of ergonomic portable pill crusher tool 14. Working force Fw is preferably a combination of a linear (axial) pressing force and a rocking/rotating action applied to elongate handle 20. Working force Fw results in axial force Fa and radial forces Fr, with respect to third axis 28-2, applied by convex tip 28-1 to crush the pill(s), e.g., the plurality of pills 12, positioned between first cup 16 and second cup 18. Diameter 22-3 of distal end 22-2 of work portion 28 of shaft 22 is preferably less than half of diameter 18-3 of bottom surface 18-1 of second cup 18 so as to permit convex tip 28-1 of distal end 22-2 of shaft 22 freedom to move side-to-side in second cup 18 along bottom surface 18-1 within side wall 18-2 of second cup 18. The pill particles may be gently agitated during the crushing operation by moving second cup 18, e.g., side-to-side or rotationally, relative to first cup 16.

As second cup 18 is removed from first cup 16, any particles of the crushed medication adhering to second cup 18 may be brushed off into first cup 16. Also, any particles of the crushed medication adhering to first cup 16 may be dislodged from bottom surface 16-1 and/or side wall 16-2 by tapping bottom surface 16-1 and/or side wall 16-2, e.g., on a table top or with an object, such as ergonomic portable pill crusher tool 14.

While this invention has been described with respect to at least one embodiment, the present invention may be further modified within the spirit and scope of this disclosure. For example, the dimensional proportions of ergonomic portable pill crusher tool 14 shown in FIGS. 1-3 are exemplary of one embodiment, and those skilled in the art will recognize that variations from the dimensional proportions shown may be made without departing from the scope of the present invention. For example, one skilled in the art will recognize that the size of elongate handle 20 may be increased or decreased from that shown to accommodate the handle size desired by respective users. For example, the handle size may come in a plurality of sizes, such as small, medium and large, to more precisely fit the size of the hand of a particular user. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ergonomic portable pill crusher tool for use in crushing a pill, comprising:

an elongate handle having a first end, a second end, a central portion, and a first axis, said first end being spaced apart from said second end along said first axis, with said central portion being located midway between said first end and said second end, said central portion being the central one-third of an entire lateral extent of the elongate handle; and a shaft having an offset portion and a work portion, said offset portion defining a proximal end of said shaft and said work portion defining a distal end of said shaft, said offset portion being connected at said proximal end to said second end of said elongate handle, said offset portion transitioning to said work portion in a direction from said proximal end to said distal end, said offset portion having a second axis that is arranged to be oblique with respect to said first axis of said elongate handle at a first angle facing said central portion, said work portion having a third axis that is arranged to be oblique with respect to said second axis of said offset portion at a second angle facing away from said central portion, such that an extent of said work portion along said third axis is substantially perpendicular to said first axis of said elongate handle at said central portion of said elongate handle, and said distal end of said work portion having a tip configured to facilitate application of a working force to crush said pill, said ergonomic portable pill crusher tool being configured to be completely self-contained to facilitate transfer of said working force to said distal end to crush said pill when said working force is applied to said elongate handle by a user.

2. The ergonomic portable pill crusher tool of claim 1, including a flexure portion located between said elongate handle and said work portion that facilitates a flexure of said work portion along said third axis when said working force is applied by a user along said third axis via said elongate handle.

3. The ergonomic portable pill crusher tool of claim 2, wherein said flexure portion is formed as a cantilever union of said elongate handle and said shaft.

4. The ergonomic portable pill crusher tool of claim 2, wherein a material forming said offset portion and a cross-sectional area of said offset portion are selected to form said flexure portion in said offset portion.

5. The ergonomic portable pill crusher tool of claim 1, wherein said tip at said distal end of said work portion is convex to facilitate application of axial and radial forces, with respect to said third axis, to said pill.

6. The ergonomic portable pill crusher tool of claim 1, being configured such that said working force for crushing said pill is a combination of a linear force along said third axis and a rocking action.

7. The ergonomic portable pill crusher tool of claim 1, wherein said shaft is made of plastic.

8. The ergonomic portable pill crusher tool of claim 1, wherein said offset portion of said shaft is integrally formed with said elongate handle such that said shaft and said elongate handle are formed as an integral one-piece device.

9. The ergonomic portable pill crusher tool of claim 1, wherein said elongate handle has a plurality of handhold recesses to accommodate grasping of said elongate handle by the fingers of a user.

10. The ergonomic portable pill crusher tool of claim 1, further comprising a sleeve that fits over said elongate handle, said sleeve having a plurality of handhold recesses to accommodate grasping of said elongate handle by the fingers of a user.

11. An ergonomic portable pill crusher system for use in crushing a pill, comprising:

an ergonomic portable pill crusher tool including:

an elongate handle having a first end, a second end, a central portion, and a first axis, said first end being spaced apart from said second end along said first axis, with said central portion being located midway between said first end and said second end; and a shaft having an offset portion with a second axis and a work portion with a third axis, said offset portion defining a proximal end of said shaft that is connected to said elongate handle and said work portion defining a distal end of said shaft; and a pill facilitating arrangement including a holding surface configured to hold said pill and a covering member interposed between said distal end of said shaft and said holding surface.

12. The ergonomic portable pill crusher system of claim 11, wherein said covering member is a layer of a paper material.

13. The ergonomic portable pill crusher system of claim 11, wherein said offset portion is connected at said proximal end to said second end of said elongate handle, said offset portion transitioning to said work portion in a direction from said proximal end to said distal end, said offset portion having said second axis is arranged to be oblique with respect to said first axis of said elongate handle at a first angle facing said central portion, said work portion having said third axis is arranged to be oblique with respect to said second axis of said offset portion at a second angle facing away from said central portion, such that an extent of said work portion along said third axis is substantially perpendicular to said first axis of said elongate handle at said central portion of said elongate handle.

14. The ergonomic portable pill crusher system of claim 11, wherein said distal end of said work portion has a convex tip to facilitate application of axial and radial forces, wherein when a user applies a working force to said elongate handle, said working force resulting in said axial and radial forces with respect to said third axis applied to said covering member to crush said pill.

15. The ergonomic portable pill crusher system of claim 14, wherein said working force is a combination of a linear force and a rocking action applied to said elongate handle.

16. The ergonomic portable pill crusher system of claim 11, wherein:

said distal end of said work portion of said shaft has a first diameter;

said covering member includes a bottom surface having a second diameter and a side wall extending upwardly from said bottom surface; and said first diameter of said distal end of said work portion of said shaft being less than half of said second diameter of said bottom surface of said covering member so as to permit said distal end of said shaft freedom to move side-to-side in said covering member along said bottom surface within said side wall of said covering member.

17. The ergonomic portable pill crusher system of claim 11, wherein said holding surface is in the form of a cup formed from a transparent plastic, and includes a bottom surface and a side wall extending upwardly from said bottom surface, said side wall including measurement indicia for measuring a volume of crushed medication resulting from said crushing of said plurality of pills.

18. The ergonomic portable pill crusher system of claim 11, wherein said pill is one of a plurality of pills held by said holding surface.

19. The ergonomic portable pill crusher system of claim 11, wherein said offset portion of said shaft is integrally formed with said elongate handle such that said shaft and said elongate handle are formed as an integral one-piece device.

20. An ergonomic portable pill crusher tool for use in crushing a pill, comprising:

an elongate handle having a first end, a second end, and a first axis, said second end being spaced apart from said first end along said first axis; and a shaft made of plastic, said shaft having an offset portion with a second axis and a work portion with a third axis, said offset portion defining a proximal end of said shaft that is connected to said elongate handle at said second end, and said work portion defining a distal end of said shaft with said third axis being substantially perpendicular to said first axis, said ergonomic portable pill crusher tool being configured to be completely self-contained to transfer a working force to said distal end of said working portion of said shaft to crush said pill when said working force is applied to said elongate handle by a user.

* * * * *